United States Patent [19]

Wang

[11] 4,382,382
[45] May 10, 1983

[54] MULTILEVEL LIQUID SENSING SYSTEM

[75] Inventor: Jish M. Wang, Schenectady, N.Y.

[73] Assignee: General Electric Company, Schenectady, N.Y.

[21] Appl. No.: 284,166

[22] Filed: Jul. 17, 1981

Related U.S. Application Data

[63] Continuation of Ser. No. 90,360, Nov. 1, 1979, abandoned.

[51] Int. Cl.³ .............................................. G01F 23/00
[52] U.S. Cl. .................................... 73/304 R; 73/291; 340/620; 364/509
[58] Field of Search .................... 73/304 R, 861, 291; 340/612, 620, 870.38, 870.25, 147 CV, 147 CN, 150; 307/244; 364/509, 510

[56] References Cited

U.S. PATENT DOCUMENTS

| | | | |
|---|---|---|---|
| 824,098 | 6/1906 | Dawes | 340/518 |
| 3,082,292 | 3/1963 | Gore | 174/117 |
| 3,227,922 | 1/1966 | Glaser et al. | 307/244 X |
| 3,238,386 | 3/1966 | Schaffner | 307/244 |
| 3,261,005 | 7/1966 | Shade | 340/870.06 |
| 3,335,334 | 8/1967 | Albisser | 340/620 |
| 3,370,466 | 2/1968 | Chang | 73/304 R |
| 3,498,131 | 3/1968 | Rickey | 340/620 X |
| 3,591,854 | 12/1968 | Cole | 307/355 X |
| 3,781,840 | 12/1973 | Roberts et al. | 340/612 |
| 3,885,167 | 5/1975 | Berglund | 307/244 X |
| 3,947,692 | 3/1976 | Payne | 73/304 R X |
| 3,967,238 | 6/1976 | Redpath et al. | 340/620 X |
| 4,027,172 | 5/1977 | Hamelink | 73/304 R |
| 4,036,053 | 7/1977 | Jenkins | 73/295 |
| 4,068,211 | 1/1978 | Van Tol | 340/505 X |
| 4,203,325 | 5/1980 | Cowles et al. | 73/304 R |
| 4,244,385 | 1/1981 | Hotine | 73/304 R X |
| 4,254,470 | 3/1981 | Jordan | 364/510 |
| 4,265,262 | 5/1981 | Hotine | 137/2 |

FOREIGN PATENT DOCUMENTS 2229049 1/1975 France .............................. 73/304 R Primary Examiner—Daniel M. Yasich
Attorney, Agent, or Firm—Donald R. Campbell; James C. Davis, Jr.; Marvin Snyder

[57] ABSTRACT

A conductive multilevel liquid sensor uses conventional integrated circuits such as inverters and voltage comparators as signal detectors, and a flat cable having corrosion-resistant probe conductors of different lengths as the sensing probe assembly. The binary encoded outputs of the signal detectors identify the sensed liquid level. A continuous level control is realized by the addition of timing logic, and sensor operation range is improved by having the voltage at one comparator input be adaptive to the change in liquid conductivity.

4 Claims, 13 Drawing Figures

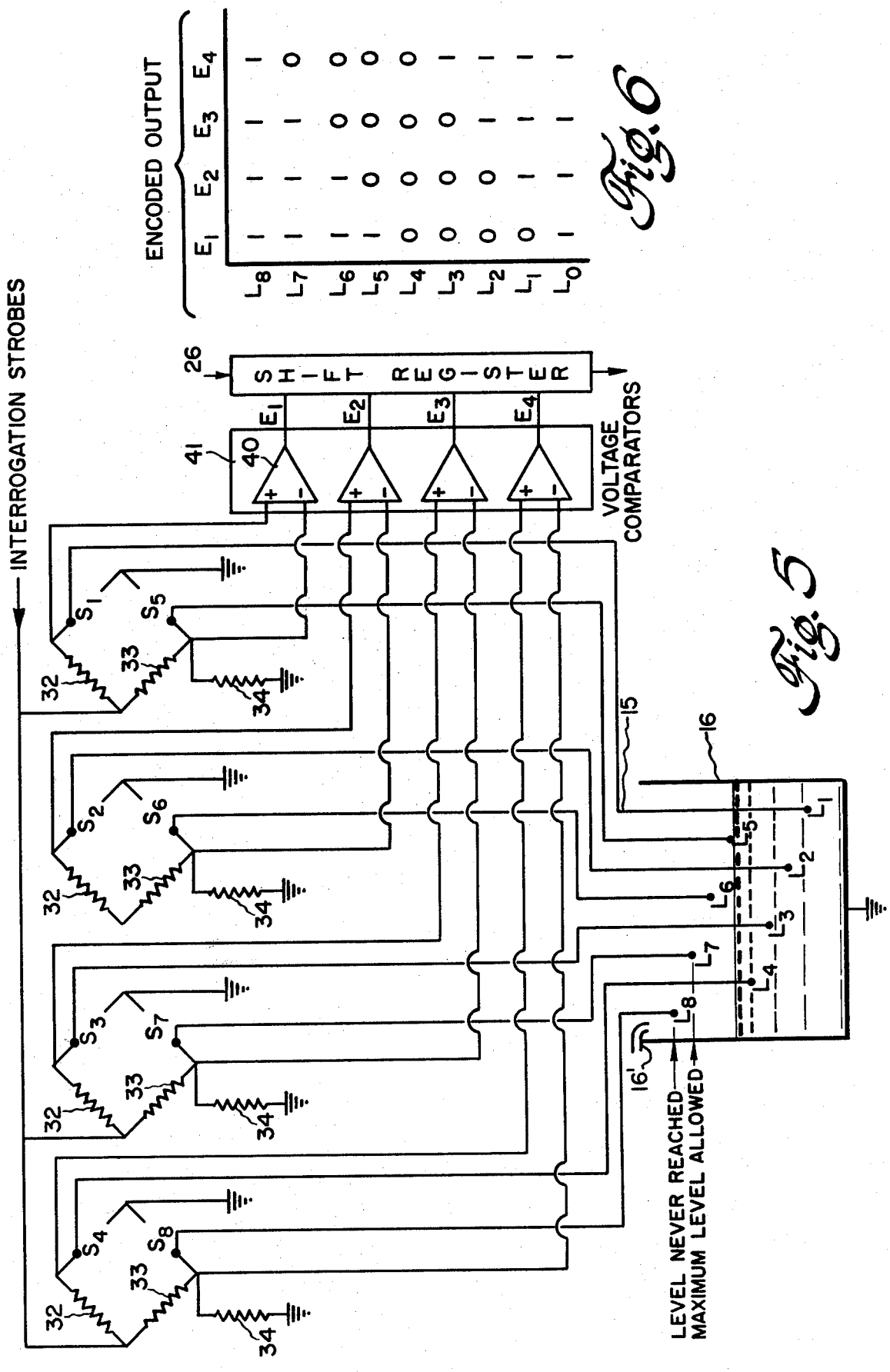

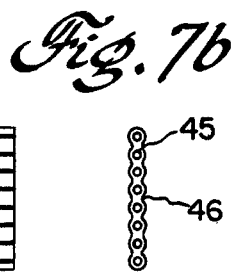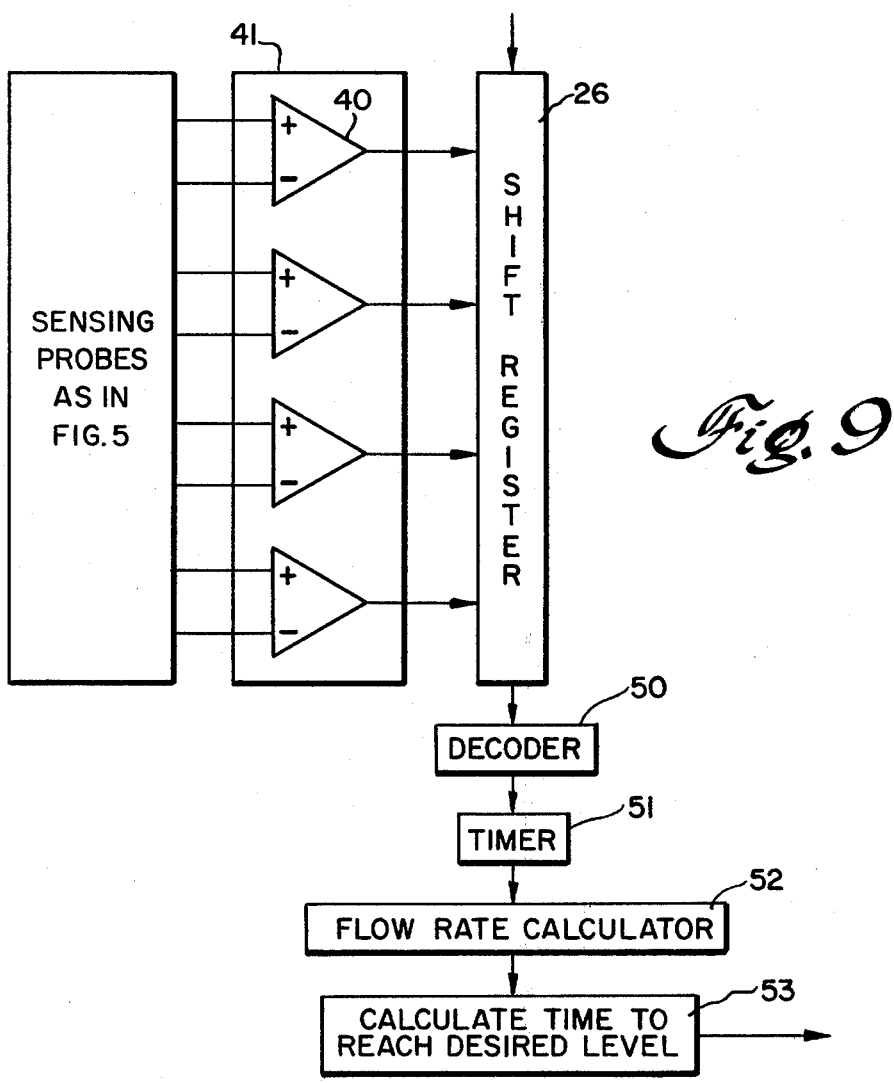

MULTILEVEL LIQUID SENSING SYSTEM

This is a continuation of application Ser. No. 090,360, filed Nov. 1, 1979, now abandoned.

BACKGROUND OF THE INVENTION

This invention relates to liquid level sensors and especially to conductive multilevel sensing systems that are cost effective.

The electrolytic conductivity probe has been used as a liquid level detector for many years. The basic device consists of a conducting rod mounted on an insulated support and extending down to the level to be detected. The rod is connected to an electronic detector unit which supplies a small electrical potential to the rod and senses when the rod is short-circuited by the rising liquid. The electronic unit usually contains a relay to switch on motors, alarms, etc. A detector of this type for blind people is described by R. Roberts and G. Jernakoff in U.S. Pat. No. 3,781,840 and has discrete transistors or amplifiers as signal detectors.

For single level sensing, a device using a discrete detector and an electrical probe similar to the one in this patent is suitable. However, it is not the most cost effective way of implementing a multilevel detector due to the number of components required and the potential complexity of packaging the device. Furthermore, protection should be provided for the electrical probe when the liquid to be sensed is chemically corrosive.

SUMMARY OF THE INVENTION

A conductive multilevel liquid sensing system uses low cost conventional integrated circuits as signal detectors and preferably has a corrosion-resistant flat cable as the sensing probes or electrodes. The probe assembly is composed of conductors of varying lengths whose liquid submersible lower ends are at different levels, and may include a common or ground probe at the lowest level (needed for an insulating container). A train of interrogation pulses, either ac pulses or low duty cycle dc pulses, are fed in parallel to the probe conductors. The electronic signal detectors are inverters, exclusive OR/NOR gates, and voltage comparators; these are coupled to the probe conductors and have a binary output which changes when the probe condition changes. The binary outputs of the signal detectors in combination indicate the sensed liquid level and are passed to a shift register or other storage means for readout to control circuitry between interrogation pulses or at other intervals. The number of levels that can be sensed and controlled is not limited to the number of sensing probes (typically 6–16), since timing logic can be provided which accepts the binary encoded outputs read out of storage and calculates the flow rate of liquid between adjacent probes to realize a continuous level measurement.

One embodiment uses inverters, one per sensing probe, as the signal detectors. The input voltage to an inverter is maintained at "high" level by pull-up resistors with the conductors in air, but when the conductor's lower end is submerged in liquid the input is shorted to ground and causes a change in state of the inverter output. Another embodiment has voltage comparator signal detectors; pairs of probe conductors are connected with fixed value resistors to form resistance bridges. The voltage comparator is in one output state if both probes are submerged in the liquid or are out of the liquid, and is in the other output state if one probe is in the liquid and the other is not. The flat cable sensing probe assembly with stainless steel wires is low cost and protects against corrosion and contamination.

Sensor operation range is increased by making the voltage comparator signal detector more adaptive to the change in fluid resistivity. A home laundry, for instance, may need to detect fluid with a wide range of conductivity because of a wide variety of supply water, detergents, and soaps, and other additives. A sensor configuration with one voltage comparator per probe conductor has a fluid conductivity sensor which generates an output voltage that varies with measured conductivity, and this output voltage is fed to one input of each comparator. The binary output of the comparator indicates that the respective sensing probe is in or out of the liquid. A quasi-adaptive configuration has a probe assembly with a common or ground probe and employs one voltage comparator per level sensing probe conductor. One level sensing probe and the common probe are associated with fixed value resistors to form a resistance bridge. The threshold voltage at which the comparator changes state varies with the liquid conductivity.

BRIEF DESCRIPTION OF THE DRAWINGS

FIG. 5 is an eight-level liquid sensing system with voltage comparators for signal detectors;

FIG. 6 is a table of encoded digital outputs in FIG. 5;

FIGS. 7a and 7b are plan and end views of a flat cable before being cut diagonally into two probe assemblies;

FIG. 8 shows a flat cable probe assembly with a ground probe;

FIG. 9 is a block diagram of timing logic for processing the detector outputs to realize a continuous level system;

DESCRIPTION OF THE PREFERRED EMBODIMENTS

Conductive level sensors utilize the principle that many fluids (i.e., water and other polar liquids) conduct electricity to some degree. If an ac voltage is applied between two electrical probes submerged in the fluid of finite conductivity, an electrical signal is generated. A device with very high input impedance can be used to sense the presence or absence of the fluid, since the electrical resistance of the fluid is generally very high. Certain CMOS (complementary metal-oxide-semiconductor) integrated circuits and linear integrated circuits are good choices as signal detectors; among the former are inverters, exclusive OR, and exclusive NOR gates, and among the latter are voltage comparators. The principal embodiments have a flat cable sensing probe assembly with stainless steel or other corrosion-resistant conductors to protect against chemical/electrolytic corrosion and long-term contamination.

Figure 1:
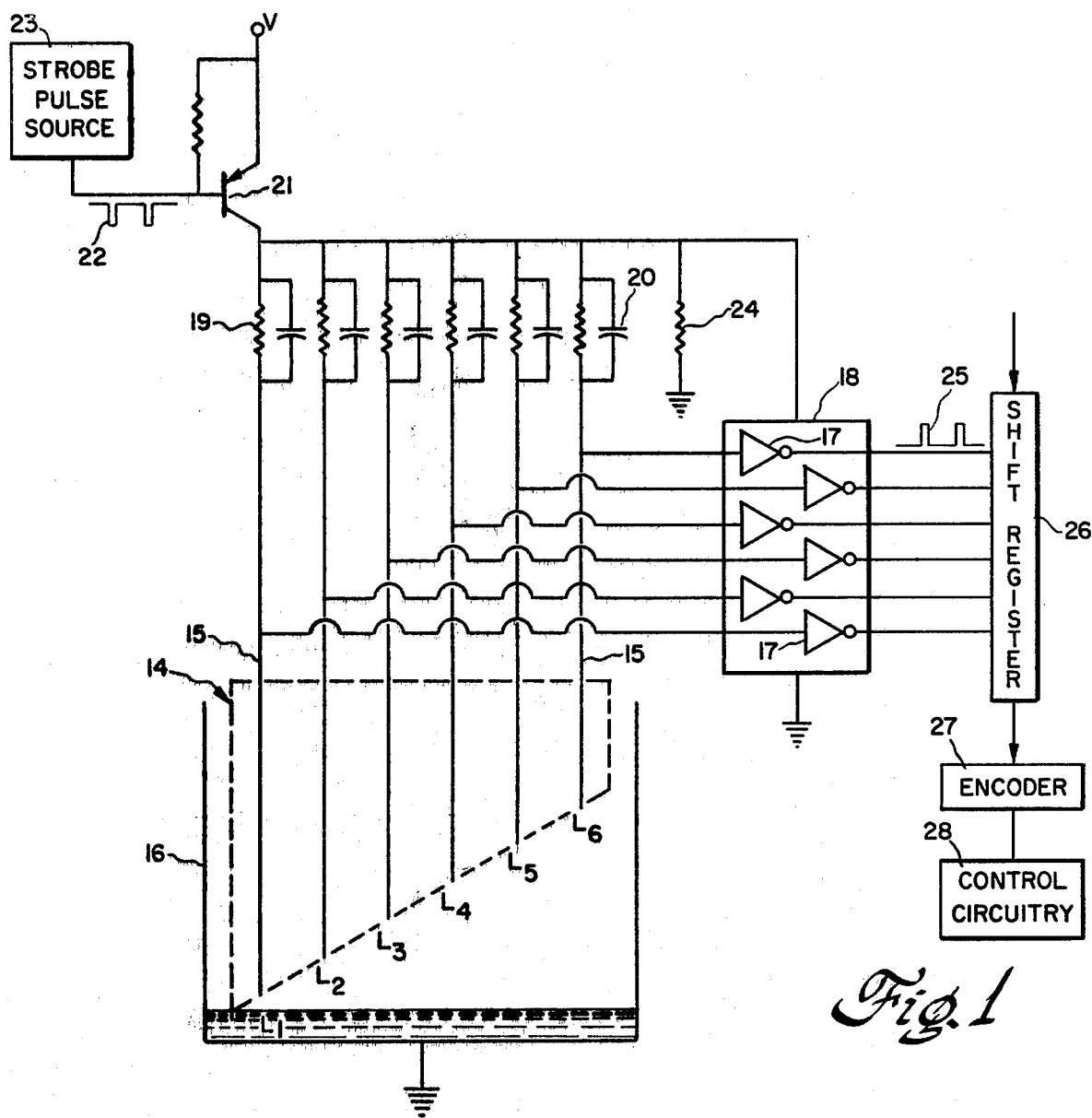
FIG. 1 is a schematic diagram of a six-level electronic liquid level sensor having inverters for signal detectors.

The six-level sensor in FIG. 1 is implemented with a single chip of CMOS hex inverters, such as Type 4049/4050 manufactured by RCA Corp. and others. Flat cable probe assembly 14 is shown schematically and has six conductors or sensing probes 15 of different lengths, whose lower ends are at levels $L_1$ to $L_6$. The probe assembly is appropriately mounted within container 16 which is assumed to be metal. The upper ends of probe conductors 15 are individually and directly connected to six inverter circuits 17 on an integrated circuit chip 18. For CMOS integrated circuits, the inverter inputs are maintained at high levels through pull-up resistors 19 when the sensing probes are in air. A small capacitor 20 (e.g., 100 pf) can be placed in parallel with each pull-up resistor 19 to improve the rise time and waveshape of the output pulses. Voltage to the inverters is supplied through a pnp transistor 21 which is connected to a source V and is turned on and off by interrogation strobes 22 generated by a pulse source 23. This is a pulsed dc source with a low duty cycle (i.e., 0.1 percent "on" time) and produces no noticeable plating effect even after long periods of continuous operation. The fast response time of the inverter signal detectors (approximately 1 microsecond) is such that only a very short strobe (a few microseconds) is needed, instead of a more complex ac source, to interrogate and to store the detector output signals for future control applications. However, it is preferred to operate at lower frequency (i.e., 1 Hz) with longer pulse width (i.e., 1 millisecond) to insure proper interrogation.

As transistor 21 turns on and off, interrogation pulses are fed in parallel through resistors 19 to sensing probes 15. Resistor 24 is a return path if all of the probes are in air and discharges transistor storage current. The input to an inverter 17 is maintained at high level when the associated probe is in air, and the output signal is in the low state or is a binary "0". However, when the probe tip is submerged in the liquid to be sensed, the input is then shorted to ground level and causes a change of state of the inverter output signal. The detector output changes to the high state or is a binary "1". Digital output signals 25 are fed to a shift register 26 or other storage means, and the pattern of "1's" and "0's" in the shift register indicate the sensed liquid level. The stored binary outputs are read out of shift register 26 to an encoder 27 between interrogation pulses or at other selected intervals. The output status signal from encoder 27 is presented to control circuitry 28 which can issue commands for various control functions such as turn-off water supply, turn-on water pump, measure flow rate for extrapolating level control, etc. The inverter just described can be replaced by one having high and low output states corresponding to high and low input voltages. The resistance of pull-up resistors 19 can be as low as a few hundred kiloohms for regular tap water to a few megohms for distilled water.

Figure 2:
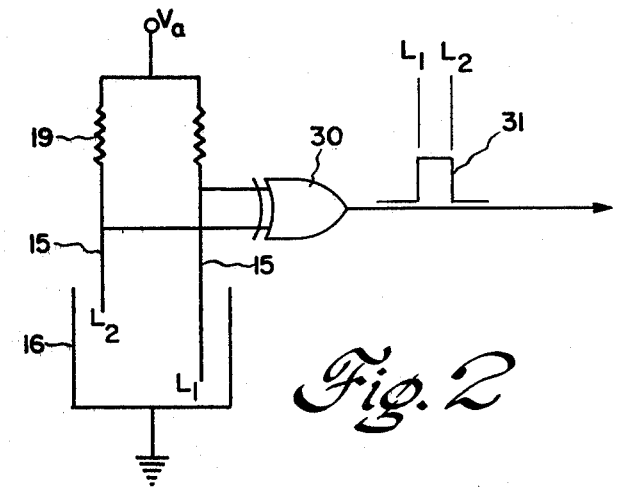
FIG. 2 is a sensor with an exclusive OR detector.

The two-level sensing system in FIG. 2 has a CMOS exclusive OR circuit 30 as the signal detector. With both probe conductors 15 in the air, both input voltages are at a high level and the output is in the low state. As liquid begins to fill container 16 and reaches level $L_1$, the lower end of one probe conductor is submerged and one input to exclusive OR 30 is shorted to ground level, causing the output to switch to its high state. Upon reaching liquid level $L_2$, the lower end of the second probe conductor becomes submerged causing the other input to exclusive OR 30 to change to low level and the output to switch back to its low state. Binary output signal 31 thus changes as the probe condition changes. Assuming that there are additional sensing probes and signal detectors, each having a binary output signal, the binary outputs in combination identify the sensed liquid level. $V_a$ in this and other figures designates the source of voltage and interrogation pulses. The signal detectors for this configuration may be exclusive NOR integrated circuits.

Figure 3:
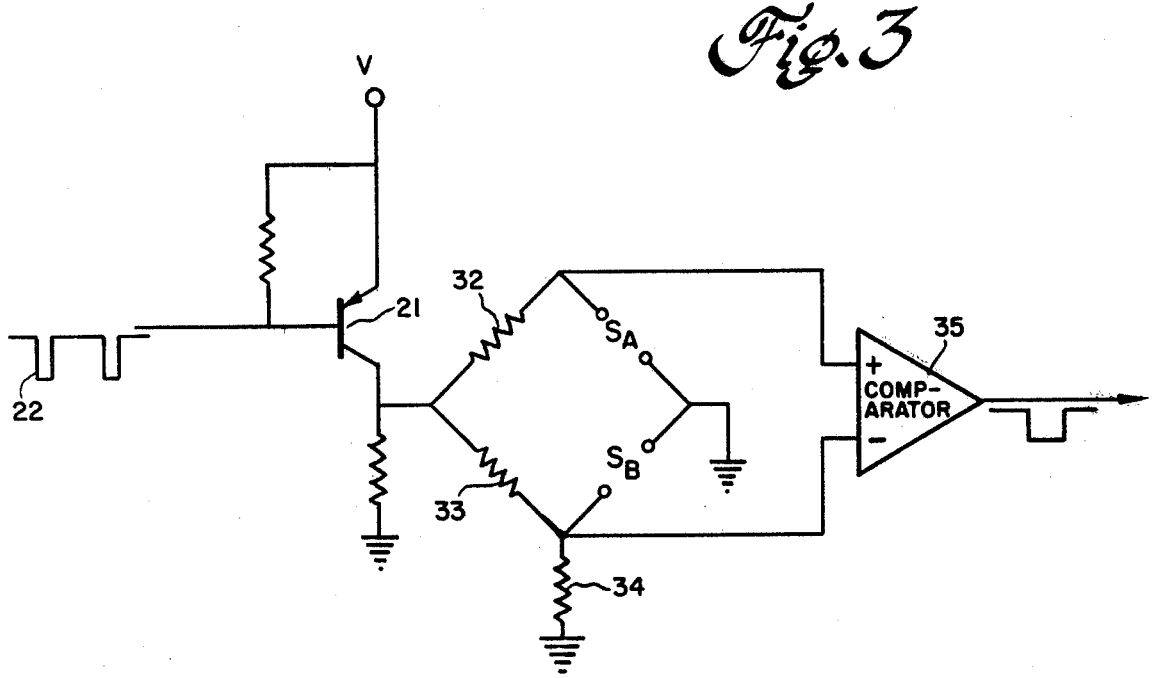
FIGS. 3 and 4 show one stage of a sensor using voltage comparators having, respectively, a pulsed dc source and an ac source.

A voltage comparator can also be used as a signal detector as shown in FIG. 3. Two sensing probes $S_A$ and $S_B$ and three fixed value resistors 32, 33, and 34 are connected to form a Wheatstone bridge circuit. The bridge circuit is powered through a pnp transistor 21 identical to that in FIG. 1. The junction between resistor 32 and probe $S_A$ in one branch of the bridge is connected to the noninverting input of voltage comparator 35, and the inverting input is connected to the junction between resistor 33 and probe $S_B$. Let it be assumed that resistors 33 and 34 are greater than resistor 32 which in turn has a resistance much greater than that of the two sensing probes in liquid. Resistor 34 makes it possible to know which state the bridge is in when both probe conductors are in air. By properly choosing the value of the resistors, the output of voltage comparator 35 changes state each time the condition of the probe changes. It is in the high or binary "1" state when both $S_A$ and $S_B$ are in air. It changes to low or binary "0" state when $S_A$ is submerged in water, and back to high or binary "1" state when the water level reaches $S_B$. The converse is possible, switching from low to high back to low state, if the connections of the probes to the detectors inputs are interchanged. As one example of the resistor values, if it is assumed the level sensor must be able to detect liquid with a wide range of conductivity (20–3000 micromho/cm), is that resistor 33 is 510 kiloohms, resistor 34 is 1 megohm and resistor 32 is 240 kiloohms. The resistance values and ratios of resistance must be within certain limits in order to get the proper comparator outputs.

Figure 4:
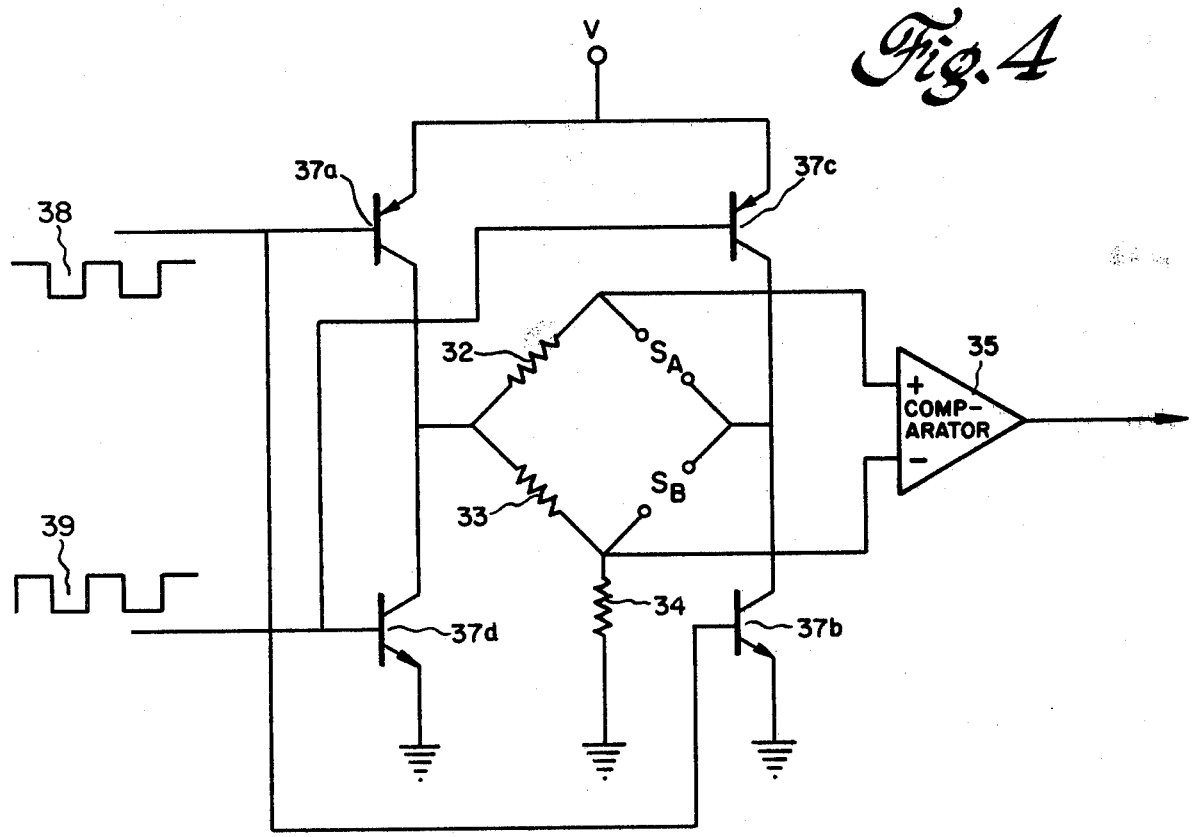

An ac voltage with no dc component is often preferred for the conductive level sensor to prevent plating problems normally incurred by using a pure dc source. FIG. 4 illustrates an ac source for generating a train of ac interrogation pulses (i.e., square wave at 50 percent duty cycle) which are supplied to the resistance bridge. Transistors 37a and 37b are turned on and off simultaneously by negative-going interrogation strobes 38, and alternately transistors 37c and 37d are operated simultaneously by positive-going interrogation strobes 39. The repetition rate of ac pulses can be high because the bipolar currents to the probes prevent gas accumulation and plating at the surfaces of the probes, but a few kilohertz is a realistic upper limit. The low duty cycle pulsed dc voltage has a much lower permissible repetition rate not exceeding 1 kilohertz at best. The output signals are interrogated during one half period, either positive half or negative half to insure proper sign.

FIG. 5 shows an eight-level sensing system with integrated circuit voltage comparators for signal detectors and a flat cable sensing probe assembly. In this figure the liquid inlet pipe is shown at 16'. The system has four resistance bridges identical to or similar to those just described and sensors $S_1$ to $S_8$ have probe conductors which terminate at levels $L_1$ to $L_8$. If a proper connection is made between the sensing probes and the inputs of voltage comparators 40, one per bridge, an encoded digital output status signal is automatically generated by the detectors for easy interface with a microprocessor controller after being stored and read out of shift register 26. FIG. 6 is a table of encoded outputs for each state of the probes; all the probes are in air at level $L_0$, the maximum level allowed is $L_7$, and $L_8$ is never reached and is provided for overflow protection. At $L_5$, for example, sensors $S_1$ and $S_5$ are both submerged and output signal $E_1$ is a binary "1"; sensors $S_2$, $S_3$, and $S_4$ are submerged and sensors $S_6$, $S_7$, and $S_8$ are in air so that outputs $E_2$, $E_3$, and $E_4$ are all a binary "0". At $L_6$, the tip of sensor $S_6$ is submerged and $E_2$ changes to a binary "1", the other outputs remaining the same. The detectors may be a single chip 41 of quad comparators such as Type LM 339 manufactured by Texas Instruments, Inc., National Semiconductor Corp., etc. A similar arrangement can be implemented to virtually any number of levels desired.

Referring to FIGS. 7a and 7b, a low cost probe assembly is made of multiconductor flat cable or ribbon cable. A measured length of cable is cut diagonally at 42 to make two probe assemblies 43 and 44. The diagonal cutting process also increases the exposure area at the tip of the probe assembly and improves the probe sensitivity. Solid wires rather than stranded wires are used as conductors to maintain the integrity of the tip of the probe assembly. The number of conducting wires 45 in the cable is determined by the range of the liquid level to be controlled and the desired resolution of the liquid level to be sensed directly. The spacing of adjacent wires of the cable is preferably kept at an increment of 0.050 inches to enable the use of commercial cable connectors to interconnect to the associated electronics. This minimizes the cable length of each probe assembly and makes it easy to handle in the event a large number of conductors are needed.

Most commercial flat cables are made by laminating bare copper conductors together using plastic or rubber materials. As a result, gaps between the conductors and bonding materials exist or will develop if the cable is immersed in chemically corrosive solutions. One way of improving corrosion resistance of the cable is to have protected coated solid wires instead of bare wires. This still leaves the ends of the cable exposed to the liquid and the tips can be corroded away, but additional protection can be achieved by electroplating the tips with corrosion-resistive conducting materials. A better way of achieving long term corrosion resistance is to use corrosion-resistant solid wires as the cable conductors, such as titanium wire or stainless steel wire (Type 336 or 6×). The preferred sensing probe assembly is made of highly corrosion-resistant stainless steel conductors laminated into flat cable with Teflon ® resin. The Teflon or polytetrafluoroethylene lamination material (indicated at 46) provides excellent electrical insulation between probes within the assembly and also minimizes potential long term surface contamination of the probe because of its nonsticking property. Further improvement in preventing surface contamination is achieved by rinsing the probe assembly with clean rinse water after each use. This can be done easily in a clothes washer or dish washer application by channeling some rinse water over the probe assembly during the spin-/rinse cycle. A suitable flat cable with SS 336 conductors is sold by W. L. Gore and Associates, Inc, Flagstaff, Arizona.

Flat cable sensing probe assembly 47 in FIG. 8 has a ground or common probe such as is needed if the container is insulating. The probe assembly has several level sensing probe conductors 48 of different lengths whose tips are at different levels and, at one side, the ground or common probe conductor 49 whose end is at the lowest level. The electrical return path as the ends of level sensing conductors 48 enter the liquid in each case is through conductor 49.

The number of levels that can be sensed and controlled by this sensor is not limited to the number of sensing probe conductors. If a timing logic is implemented in conjunction with the changes of the detector output status, the flow rates between any two adjacent probes can be calculated and a continuous level control can be achieved through extrapolating between any two discrete levels as determined by the probes. The flow rate between any two levels of the fluid is monitored and calculated by dividing the quantity volume of fluid between the two levels by the time required for the fluid to rise or fall from one level to the other. The quantity of the fluid between two levels is known because it can be determined from the size (area) of the container and the level difference, and it is only necessary to measure the time for the fluid to go from one level to the other. A continuous level control can be achieved by software extrapolation based on the up-to-date flow rate calculation. The accuracy of the controlled level depends on the distance between the two previous adjacent probes which determine the accuracy of the flow rate calculation. The closer the two probes are, the more accurate the controlled level becomes, and in any event the accuracy of the indirect measured levels is always better than or equal to the discrete level spacing directly sensed by the sensing probes.

Given the discrete level sensor in FIG. 5, the additional logic needed to realize a continuous level control is diagrammed in FIG. 9. The binary encoded output read out of shift register 26 into decoder 50 changes when the sensed level changes. Timer 51 is started by the sensing of one level and stopped by the sensing of the level above or below, and the elapsed time is fed to a flow rate calculator 52. It is now possible to calculate the time to reach the desired level, and the result generated by block 53 is passed to the control circuitry.

Because of a wide variety of supply water and additives (soaps, detergents, bleaches, etc.) being used in a home laundry, the level sensor must be able to detect liquid with a wide range of conductivity, for example, 20 micromho/cm to 3000 micromho/cm. Using linear integrated circuit voltage comparators as the signal detectors, the threshold voltage at which the comparator changes state can be varied as a function of the conductivity of the liquid whose level is being sensed. The small input offset voltage of the linear IC comparator and the quasi-adaptive characteristics of the input voltages, whose values may change with the fluid conductivity, makes the voltage comparator more suitable for use as a signal detector. All of the embodiments of a multilevel sensor have fixed value resistors and because of this, the operation range of the sensor may be limited under certain conditions. It can be shown that the sensor operation range can be improved by increasing the size of the sensing probes, but the resolution or accuracy of the sensor decreases as a result. A compromise may, therefore, be needed in the final sensor design depending on the overall system objectives. Another way of improving sensor operation just discussed is by making the voltage comparator signal detector more adaptative to the change of fluid conductivity.

Figure 10:
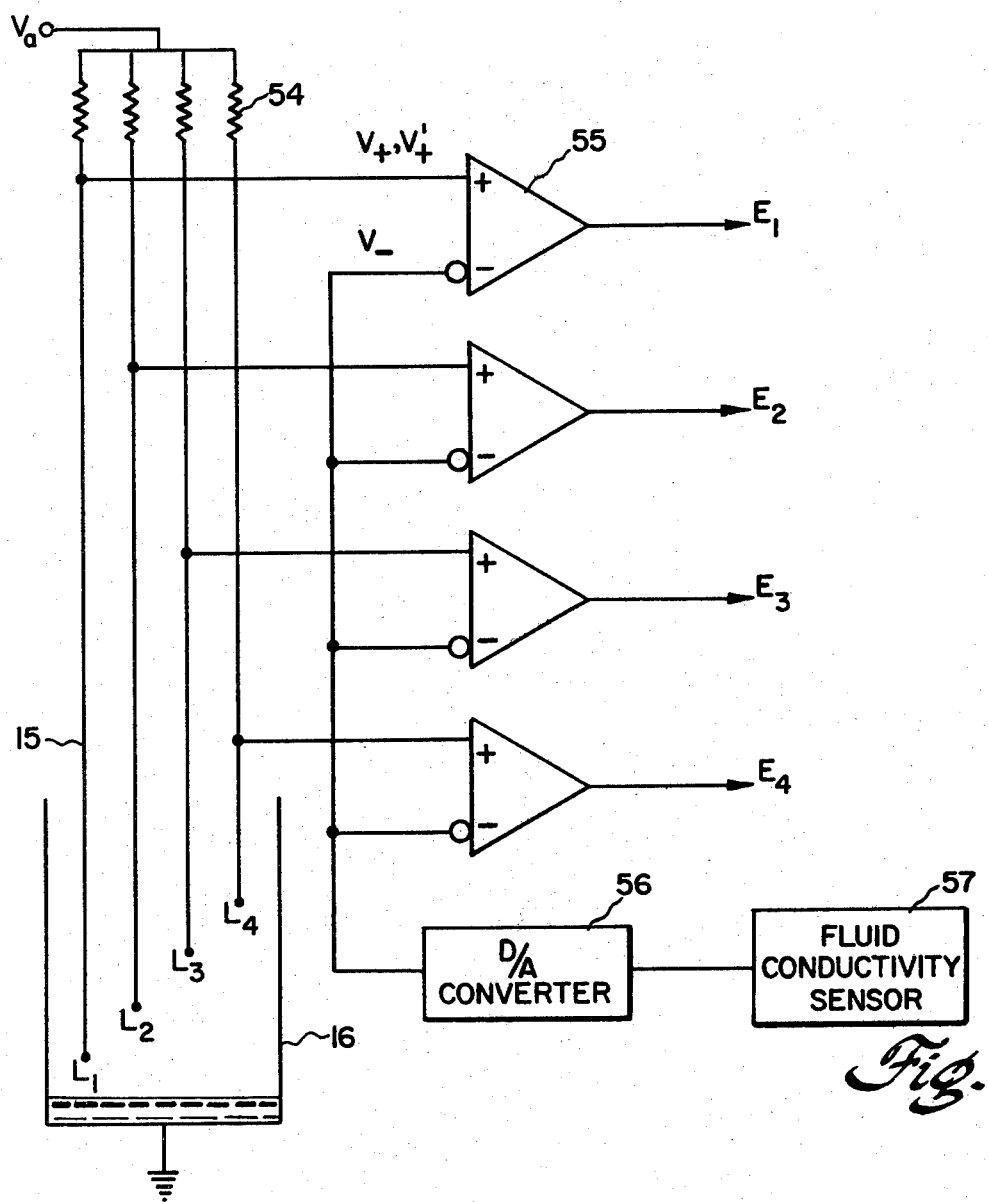
FIG. 10 is a diagram of an electronic adaptive level sensor.

The adaptative level sensor is shown in FIG. 10. Instead of using both inputs as sensing terminals as in FIGS. 3-5, only the noninverting input of each detector is connected to a sensing probe The inverting input is maintained at a voltage which is adaptive to the change of fluid conductivity as measured by a conductivity sensor. This multilevel sensing system has four probe conductors 15 whose lower ends are at levels $L_1$ to $L_4$, the other end of each probe conductor being connected to a resistor 54 and to a source of voltage and interrogation pulses $V_a$. The four voltage comparators 55 have one input connected directly to the probe conductor and the other input to a digital-to-analog converter 56 and hence to the fluid conductivity sensor 57. For a chosen value of resistor 54, the bias or threshold voltage $V_-$ of the detector is so adjusted that it is only slightly higher than the noninverting input voltage when the sensing probe is submerged in liquid (this voltage $V_+'$ changes as the fluid conductivity changes). This makes the sensor less sensitive to the probe surface leakage due to the residue of liquid because the low value pull-up resistor 54 will raise the input voltage at the noninverting terminal, $V_+$, above the value of $V_-$ immediately after the probe is out of the liquid.

Figure 11:
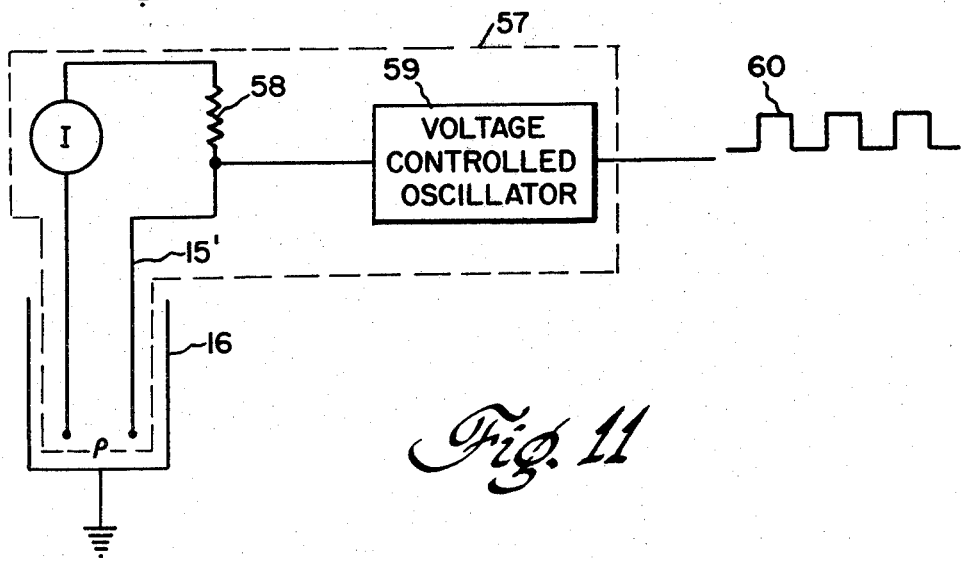
FIG. 11 shows a fluid conductivity sensor for use in FIG. 10.

One fluid conductivity sensor is shown in FIG. 11. Since the resistance between two probes 15' is directly proportional to the resistivity $\rho$ of the liquid, the conductive sensor can easily be adapted to measure the conductivity or resistivity of the fluid. A constant current source I is in series with a resistor 58 and probes 15'; with both probes submerged in the liquid, the input voltage to a voltage controlled oscillator 59 varies inversely with the conductivity of the liquid. The frequency of output pulses 60 is then inversely proportional to conductivity. The digital output of the sensor is converted to an analog input voltage for the comparators by D/A converter 56.

Figure 12:
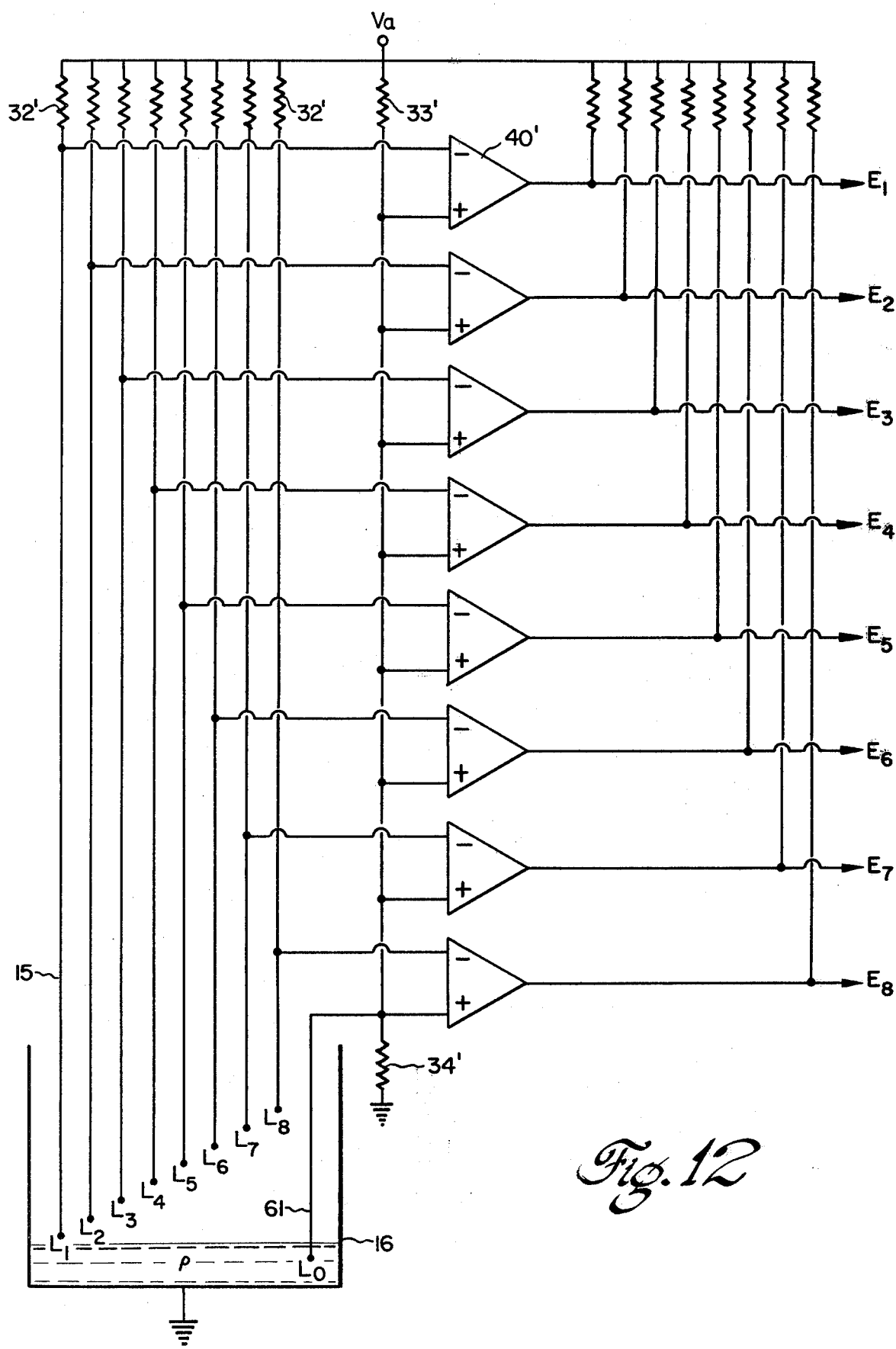
FIG. 12 illustrates a quasi-adaptive fluid level sensor.

The quasi-adaptive liquid level sensor in FIG. 12 does not require a separate fluid conductivity sensor but does have the advantage of reduced sensitivity to contamination on the probe assembly. The latter has a common or ground probe, such as that in FIG. 8, which is attached to one input terminal of the voltage comparators such that the threshold level of the comparator changes as the fluid conductivity changes. The flat cable sensing probe assembly has eight probe conductors 15 at levels $L_1$ to $L_8$ and common probe conductor 61 is at the lowest level $L_0$. The Wheatstone bridge circuits or resistance bridges, one per level sensing probe, are similar to those in FIGS. 3-5 and the three fixed value resistors in each bridge are identified by corresponding primed numerals. The inverting input of the first comparator 40' is connected to the junction between resistor 32' and the first probe conductor 15, the noninverting input is connected to the junction between resistor 33' and common probe 61, and resistor 34' is connected to the noninverting terminal. The binary output of every voltage comparator 40', one per resistance bridge, has one output state with the respective sensing probe in air and changes to the other output state when the sensing probe becomes submerged. The resistance between a submerged probe and common probe 61 is directly proportional to the resistivity $\rho$ of the liquid and inversely proportional to conductivity. Thus, the threshold voltage of the comparator, or the input voltage at the noninverting terminal, changes as the liquid conductivity changes.

Summarizing, the conductive multi-level sensor is a viable approach for home laundry, other household appliances, and many other applications because it has the following features. It uses low cost conventional components and no special development is required. Discrete levels are sensed directly and no compensation or calibration is needed. Continuous levels can be sensed and controlled by the addition of timing logic or software. The encoded digital output signals provide easy and direct interface with a microprocessor controller. It can be modified to measure fluid conductivity or detergent concentration, and provides fail-safe overflow protection through built-in redundancy.

While the invention has been particularly shown and described with reference to several preferred embodiments thereof, it will be understood by those skilled in the art that various changes in form and details may be made therein without departing from the spirit and scope of the invention.

The invention claimed is:

1. a multilevel liquid level sensing system comprising:
   a flat cable sensing probe assembly having a plurality of probe conductors whose lower ends are at different discrete levels in a container for liquids;
   resistance bridges each comprised of a pair of said probe conductors connected with three fixed value resistors, the third resistor so that the state of the bridge is known with both probe conductors out of the liquid;
   means for supplying a train of low duty cycle dc interrogation pulses in parallel to said resistance bridges and hence to said probe conductors;
   integrated circuit voltage comparator signal detectors each of which has a binary output and inverting and noninverting inputs connected across one of said resistance bridges such that the output is in one state when the lower ends of both probe conductors are in or out of the liquid, and is in the other state when the lower end of one probe conductor is in the liquid and the lower end of the other probe conductor is out of the liquid, said binary outputs in combination indicating the different discrete liquid levels;
   storage means for said binary outputs which are read out between said interrogation pulses to timing logic means to achieve a continuous liquid level control;
   said timing logic means comprising a timer which measures the time for the liquid to rise or fall between two adjacent discrete levels, and a flow rate calculator which monitors the flow rate of liquid between the two discrete levels.

2. The system of claim 1 wherein said means for supplying dc interrogation pulses includes a transistor which is turned on and off by a pulse source.

3. An adaptive multilevel liquid level sensing system comprising:
   a flat cable sensing probe assembly having a plurality of probe conductors whose lower ends are at different levels in a container for liquids;
   a resistor connected to the other end of each probe conductor;
   means for supplying a train of low duty cycle dc interrogation pulses in parallel through every resistor to said probe conductors;
   a fluid conductivity sensor for generating a voltage that varies with measured liquid conductivity;
   integrated circuit voltage comparator signal detectors each having two inputs of which one input is connected to one of said probe conductors, the other input of every voltage comparator being connected to said fluid conductivity sensor such that the threshold voltage at which each voltage comparator changes state is a function of the measured liquid conductivity;

said voltage comparators each having a binary output indicating that the lower end of the respective probe conductor is in or out of the liquid and the binary outputs in combination indicating the sensed liquid level; and storage means for said binary outputs for readout to control circuitry at preselected intervals.

4. The system of claim 3 wherein said means for supplying dc interrogation pulses includes a transistor which is turned on and off by a pulse source.

* * * * *